United States Patent
Mimura et al.

(10) Patent No.: US 8,110,116 B2
(45) Date of Patent: Feb. 7, 2012

(54) WATER TREATMENT APPARATUS AND A METHOD FOR CLEANING A FILTER LAYER OF A WATER TREATMENT APPARATUS

(75) Inventors: Hitoshi Mimura, Izumiotsu (JP); Kiyokazu Mukai, Izumiotsu (JP)

(73) Assignee: Nagaoka International Corporation, Osaka (JP)

( * ) Notice: Subject to any disclaimer, the term of this patent is extended or adjusted under 35 U.S.C. 154(b) by 345 days.

(21) Appl. No.: 12/454,556

(22) Filed: May 19, 2009

(65) Prior Publication Data
US 2010/0176071 A1    Jul. 15, 2010

(30) Foreign Application Priority Data

Jun. 19, 2008   (JP) ................................. 2008-160282
Apr. 16, 2009   (JP) ................................. 2009-099854
May 12, 2009   (JP) ................................. 2009-115306

(51) Int. Cl.
*B01D 37/00*    (2006.01)
*B01D 24/46*    (2006.01)

(52) U.S. Cl. ........ 210/792; 210/793; 210/796; 210/269; 210/274; 210/275; 210/279; 210/787; 210/788

(58) Field of Classification Search .................. None
See application file for complete search history.

(56) References Cited

U.S. PATENT DOCUMENTS

| | | | | |
|---|---|---|---|---|
| 243,212 A | * | 6/1881 | Clark ............................ | 210/796 |
| 425,573 A | * | 4/1890 | Jewell ........................... | 210/276 |
| 478,261 A | * | 7/1892 | Usher ............................ | 210/280 |
| 949,455 A | * | 2/1910 | Lincoln et al. .................. | 423/27 |
| 1,748,898 A | * | 2/1930 | Peebles ......................... | 210/270 |
| 2,296,824 A | * | 9/1942 | Ashworth ...................... | 210/793 |
| 2,309,916 A | * | 2/1943 | Palmer .......................... | 210/795 |
| 2,309,917 A | * | 2/1943 | Palmer .......................... | 210/272 |

(Continued)

FOREIGN PATENT DOCUMENTS

GB          432 742 A       10/1935
(Continued)

OTHER PUBLICATIONS

PCT Search Report Dated Jun. 5, 2007.

*Primary Examiner* — Robert James Popovics
(74) *Attorney, Agent, or Firm* — Hedman & Costigan, P.C.; James V. Costigan

(57) ABSTRACT

A water treatment apparatus includes a raw water supply tube, mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzles with a predetermined distance between the surface of the filter layer and the raw water outlet of the mixed raw water stream jet nozzles, a filtered water takeout tube provided in the filtering tank for taking out water filtered through the filter layer, a reverse stream cleaning water supply tube provided in the filtering tank for supplying reverse stream cleaning water to the filter layer, filter layer cleaning jet nozzles each communicating at one end thereof with a filter layer cleaning water supply tube and having at the other end thereof a cleaning water outlet from which cleaning water is jetted out, and an overflow outlet provided in the filtering tank above the filter layer.

1 Claim, 9 Drawing Sheets

U.S. PATENT DOCUMENTS

| | | | | |
|---|---|---|---|---|
| 2,351,835 A * | 6/1944 | Pick | | 210/273 |
| 2,538,340 A * | 1/1951 | Tomek et al. | | 210/792 |
| 2,769,547 A * | 11/1956 | Hirsch | | 210/273 |
| 2,773,829 A * | 12/1956 | Hunting | | 210/678 |
| 3,215,274 A * | 11/1965 | Schreiber | | 210/150 |
| 3,288,297 A * | 11/1966 | Stuart | | 210/272 |
| 3,374,896 A * | 3/1968 | Palmer et al. | | 210/272 |
| 3,384,240 A * | 5/1968 | Berardi | | 210/136 |
| 3,402,126 A * | 9/1968 | Cioffi | | 521/26 |
| 3,412,863 A * | 11/1968 | Stuart, Sr. | | 210/793 |
| 3,451,554 A * | 6/1969 | Wade | | 210/278 |
| 3,493,116 A * | 2/1970 | Edmiston | | 210/266 |
| 3,550,774 A * | 12/1970 | Hirs Gene et al. | | 210/792 |
| 3,564,570 A * | 2/1971 | Lincoln et al. | | 55/286 |
| 3,617,558 A * | 11/1971 | Jones | | 210/677 |
| 3,675,850 A * | 7/1972 | Ebert | | 239/254 |
| 3,680,701 A * | 8/1972 | Holca | | 210/790 |
| 3,814,245 A * | 6/1974 | Hirs | | 210/793 |
| 3,954,620 A * | 5/1976 | Nebolsine | | 210/275 |
| 4,076,625 A * | 2/1978 | Scholten et al. | | 210/274 |
| 4,113,612 A * | 9/1978 | Sekoulov et al. | | 210/606 |
| 4,118,320 A * | 10/1978 | Stuart | | 210/276 |
| 4,141,824 A * | 2/1979 | Smith | | 210/618 |
| 4,161,963 A * | 7/1979 | Stevens | | 137/592 |
| 4,187,175 A * | 2/1980 | Roberts et al. | | 210/793 |
| 4,220,531 A * | 9/1980 | Robison | | 210/189 |
| 4,312,764 A * | 1/1982 | Parshall | | 210/790 |
| 4,404,106 A * | 9/1983 | Muller et al. | | 210/772 |
| 4,496,464 A * | 1/1985 | Hensley | | 210/792 |
| 4,624,783 A * | 11/1986 | Black et al. | | 210/271 |
| 4,627,923 A * | 12/1986 | Ross | | 210/744 |
| 4,826,609 A * | 5/1989 | Hensley | | 210/792 |
| 4,957,631 A * | 9/1990 | Pauwels | | 210/264 |
| 4,966,698 A * | 10/1990 | Hensley | | 210/269 |
| 5,141,635 A * | 8/1992 | LePlang et al. | | 210/198.2 |
| 5,171,443 A * | 12/1992 | Bratten | | 210/280 |
| 5,356,541 A * | 10/1994 | Wickzell | | 210/791 |
| 5,407,574 A * | 4/1995 | Hensley | | 210/269 |
| 6,287,474 B1 * | 9/2001 | Dean | | 210/796 |
| 6,615,469 B1 * | 9/2003 | Burcham | | 29/401.1 |
| 7,014,758 B2 * | 3/2006 | Nagaoka | | 210/209 |
| 7,022,230 B2 * | 4/2006 | Imai et al. | | 210/289 |
| 7,097,766 B2 * | 8/2006 | Moya | | 210/272 |
| 7,341,662 B2 * | 3/2008 | Tolley et al. | | 210/275 |
| 7,553,418 B2 * | 6/2009 | Khudenko et al. | | 210/601 |
| 8,012,359 B2 * | 9/2011 | Parkinson | | 210/786 |
| 2003/0080039 A1 * | 5/2003 | Cocoli | | 210/275 |
| 2004/0040904 A1 * | 3/2004 | Nagaoka | | 210/209 |
| 2004/0074836 A1 * | 4/2004 | Long | | 210/435 |
| 2004/0195162 A1 * | 10/2004 | Imai et al. | | 210/289 |
| 2004/0238430 A1 * | 12/2004 | Moya | | 210/280 |
| 2007/0264704 A1 * | 11/2007 | Van Toever | | 435/262 |
| 2008/0006589 A1 * | 1/2008 | Reimann-Philipp et al. | | 210/794 |
| 2009/0045135 A1 * | 2/2009 | Khudenko et al. | | 210/631 |
| 2009/0242487 A1 * | 10/2009 | Vero et al. | | 210/661 |
| 2009/0294356 A1 * | 12/2009 | Beggs | | 210/618 |
| 2010/0072117 A1 * | 3/2010 | Swain | | 210/108 |
| 2010/0176071 A1 * | 7/2010 | Mimura et al. | | 210/798 |
| 2010/0320159 A1 * | 12/2010 | Lee et al. | | 210/792 |

FOREIGN PATENT DOCUMENTS

| | | |
|---|---|---|
| GB | 610 412 A | 10/1948 |
| JP | 2002-126768 | 5/2002 |
| WO | WO02/34677 A2 | 5/2002 |
| WO | WO02/34877 A3 | 5/2002 |

* cited by examiner

WATER TREATMENT APPARATUS AND A METHOD FOR CLEANING A FILTER LAYER OF A WATER TREATMENT APPARATUS

TECHNICAL FIELD

This invention relates to a water treatment apparatus and, more particularly, to a water treatment apparatus which can oxidize iron, manganese and other substances dissolved in water such as underground water to turn them into substances which are insoluble in water with a simple and compact apparatus and without using a chemical such as an oxidizing agent or a coagulant. The invention relates also to a method for cleaning a filter layer of such water treatment apparatus.

BACKGROUND ART

Underground water is utilized as raw water for tap water and also utilized in industries which require a large quantity of water such as food, soft drink, beverage, dyestuff industries and also in public baths. In these industries, iron and manganese contents contained in underground water have raised a problem. While iron and manganese are substances which are necessary for a human body, contents of these substances exceeding a certain amount give a metal taste to water and turn water to red or black water, thereby making the water unsuitable for drinking and causing various difficulties in these industries. Further, in a foundation work in building industry, it is indispensable to remove underground water from a foundation site before the foundation work starts. If a large quantity of iron and manganese is contained in the underground water, the iron and manganese must be removed from the underground water before the underground water is discharged to the sewerage because it is legally prohibited to discharge such underground water the sewerage without any treatment.

In a currently prevailing conventional water treatment device for removing iron or manganese, an oxidizing agent such, for example, as sodium hypochlorite or a flocculant such, for example, as poly-aluminum chloride (PAC) is added to raw water to oxidize iron or manganese which is dissolved in the raw water and thereby convert it to iron oxide or manganese oxide which is insoluble in water and the iron oxide or manganese oxide is filtered out by filtering the raw water through filtering sand.

In the conventional water treatment device requiring addition of an oxidizing agent or a flocculant, however, a relatively large amount of oxidizing agent or flocculant is consumed in the device and, therefore, the cost of such oxidizing agent or flocculant is tremendous.

Further, since hypochlorous acid which is used as the oxidizing agent remains in water after the treatment for oxidizing iron and manganese, trihalomethane which is a carcinogen is generated and, for removing trihalomethane, the water must further be filtered through an activated carbon layer which adds to the cost of the water treatment. If provision of such activated carbon layer is omitted for economic reason, water after filtering must be constantly analyzed for preventing generation of trihalomethane caused by addition of an excessive amount of oxidizing agent and, if necessary, the amount of addition of the oxidizing agent must be adjusted. This method requires a high cost of maintenance in addition to the cost of purchasing the oxidizing agent.

Further, the conventional water treatment device generally is a complex and large-scale system including an aeration tank, a flocculation tank, a precipitation tank, a sand filter tower, an iron and manganese removing tower and a chemical agent tank and this system requires a large space for installation. It is impossible to install such a large device in a site of a limited space such in a town.

Furthermore, filtering sand which is used in this water treatment device requiring addition of an oxidizing agent is blocked by accumulated impurities and therefore must be replaced from time to time. The used sand to be abandoned must be treated as industrial waste because it contains a chemical agent and a place where it can be abandoned is extremely restricted by laws and regulations.

For eliminating the disadvantages of the prior art water treatment apparatus using a chemical and providing a water treatment apparatus which can oxidize iron, manganese and other elements dissolved in water such as underground water to make them insoluble in water with a simple and compact device and without using a chemical such as an oxidizing agent or a coagulant, Japanese Patent Application Laid-open Publication No. 2002-126768 (see U.S. Pat. No. 7,014,758 B2 or US 2004/0040904 A1) discloses a water treatment apparatus in which raw water is jetted out by jet nozzles in which air is introduced through an air inlet or air inlet tube. A jet water stream including multitudes of air bubbles is blown out of the raw water jetting outlet and is struck against the water surface above the filter layer disposed below the raw water jetting outlet thereby causing vehement aeration both in the water above the filter layer and on the surface of the filter layer. By virtue of this aeration, soluble substances such as iron and manganese contained in the water are oxidized and thereby are turned to insoluble substances which form flocks or precipitate and are caught on the surfaces of particles of the filter material such as filtering sand which constitutes the filter layer. Accordingly, dissolved substances such as iron and manganese in raw water can be turned to insoluble substances and filtered out with a simple and compact apparatus.

In the prior art water treatment apparatuses including one disclosed in the above described publication, iron which is made insoluble and deposited in the form of a film on the filter material tends to be removed excessively in the lower portion of the filter layer and removed insufficiently in the upper portion of the filter layer when the filter layer is cleaned with cleaning water. As to removal of iron and manganese, iron is turned to the state of film by oxidation in the upper portion of the filter layer whereas manganese is caught on the surface of the particle of the filter layer by the action of microorganism in the lower portion of the filter layer as will be described later. If, in a case where concentration of iron in raw water is significantly larger than concentration of manganese, the filter layer as a whole is cleaned with a large quantity of cleaning water for removing iron caught in the upper portion of the filter layer, microorganism living in the lower portion of the filter layer for catching manganese will be washed away and, as a result, catching of manganese in a subsequent water treatment operation will be obstructed.

On the other hand, it will be advantageous for a water treatment apparatus to increase filtering speed per unit time because, by doing so, the size and space required for the apparatus will be reduced. Particularly, space for establishing a water treatment apparatus is limited because a location at which such apparatus can be established is limited. In a case where a large scale water treatment apparatus cannot be established, necessary amount of raw water must be filtered with a small apparatus established in a narrow space and, in this case, it is necessary to increase the filtering speed of the apparatus.

An important factor necessary for increasing the filtering speed of the water treatment apparatus is efficiency of cleaning of the filter layer of the water treatment apparatus.

In a water treatment apparatus, as a filter operation is continued, the filter layer, particularly its surface portion, is covered with flocks of oxides such as iron oxide and other substances as time elapses and the filter function of the filter layer is reduced. In this case, the filter operation must be suspended temporarily and cleaning of the filter layer must be conducted. Accordingly, unless cleaning of the filter layer is conducted efficiently, increase in the filtering speed cannot be achieved.

In the water treatment apparatus described in the above described publication, the raw water supply tube is reciprocated in a plane parallel to the surface of the filter layer and the blocked filter layer is released from the blocked state by a jet water stream containing multitudes of air bubbles which is jetted out of the raw water supply tube to recover the filter function. Further, in this water treatment apparatus, a filter layer support made of a plate screen is provided in the bottom of the filter layer made of a single layer containing filtering sand and a reverse stream cleaning water supply tube for reverse stream cleaning the filter layer with reverse stream cleaning water is disposed below the filter layer support. When the upper portion of the filter layer, particularly its upper surface, has been covered with flocks of oxides and other substances, supply of raw water to the filtering tank is temporarily suspended and reverse stream cleaning water is caused to flow upwardly from the filter layer support to the entire filter layer to remove the substances covering the upper portion of the filter layer and wash away iron and manganese caught by the filter layer from an overflow outlet to the outside.

The filtering speed of this water treatment apparatus is 60 m/day to 130 m/day. In a case where it is necessary to increase the filtering speed of filter operation, cleaning of the filter layer must also be made more frequently and burden to treatment imposed by microorganism in the lower portion of the filter layer also increases. Therefore, efficiency of cleaning of the filter layer by this water treatment apparatus is limited to the above described filtering speed and a higher filtering speed cannot be achieved.

The prior art water treatment apparatus including one described in the above described publication must consume about 10% to 15% of received water (filtered water) for the above described cleaning operation with the result that efficiency of water treatment is significantly reduced.

The above described prior art water treatment apparatus has a mechanism for reciprocating the raw water supply tube in a plane parallel to the surface of the filter layer for cleaning the surface of the filter layer. Since this mechanism must reciprocate the raw water supply tube with an electric motor, a large power is required for cleaning the surface of the filter layer and a complex mechanism for reciprocation of the raw water supply tube. Further, this water treatment apparatus requires much labor and cost for maintenance of the apparatus including compensation for wear of rails for reciprocating the raw water supply tube and wear of a hose for supplying raw water to the raw water supply tube. Furthermore, for moving the raw water supply tube in which the cleaning nozzles are disposed in a line, the filtering tank must have a rectangular configuration with resulting increase in the size of the apparatus. Thus, it is difficult to make a compact design of the apparatus even in case the apparatus must be established in a narrow space.

Further, in the prior art water treatment apparatus in which cleaning of the filter layer is made by reciprocating the cleaning nozzles, the surface of the filter layer other than areas where the cleaning nozzles pass over remains uncleaned and hence it takes much time to complete cleaning of the entire surface of the filter layer resulting in difficulty in achieving a high speed cleaning of the filter layer.

It is, therefore, an object of the invention to provide a novel method for cleaning a water treatment apparatus capable of filtering water at a higher speed than the prior art water treatment apparatus and a water treatment apparatus which enables application of such method.

It is another object of the invention to provide a water treatment apparatus which has an improved filtering efficiency by reducing the ratio of amount of cleaning water to the amount of received water (filtered water) and which does not require a large power and can be made in a simple, compact design and a method for cleaning this water treatment apparatus.

SUMMARY OF THE INVENTION

Studies and experiments made by the inventors of the present invention for achieving the above objects of the invention have resulted in the finding, which has led to the present invention, that, in view of the fact that a major part of iron to be caught by a water treatment apparatus settles in the upper portion of the filter layer while a major part of manganese settles in the lower portion of the filter layer and that concentrations of iron and manganese in raw water are not equal but concentration of iron is normally much higher than concentration of manganese, a cleaning effect of removing iron in the upper portion of the filter layer can be remarkably improved by cleaning the filter layer in such a manner that a swirl stream or a random stream is formed in the water above the surface of the filter layer. The inventors have also found that the cleaning effect can be remarkably improved by removing iron by a partial cleaning process and removing manganese by a whole cleaning process whereby a high speed filtering which has not been achieved in the prior art water treatment apparatus can be realized and the amount of cleaning water can be significantly saved.

For achieving the above described objects of the invention, in the first aspect of the invention, there is provided a method for cleaning a filter layer of a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, a filtered water takeout tube provided in the filtering tank for taking out water filtered through the filter layer, a reverse stream cleaning water supply tube provided in the filtering tank for supplying reverse stream cleaning water to the filter layer, a plurality of filter layer cleaning jet nozzles each communicating at one end thereof with a filter layer cleaning water supply tube and having at the other end thereof a cleaning water outlet from which cleaning water is jetted out, said filter layer cleaning jet nozzles being disposed at a predetermined interval above the filter layer in such a manner that the cleaning water outlets are located in the vicinity of the surface of the filter layer, and an overflow outlet provided in the filtering tank above the filter layer, characterized in that the filter layer is cleaned by forming a swirl stream or a random stream in the water above the surface of the filter layer by the cleaning water jetted from the cleaning water outlets of the filter layer cleaning jet nozzles.

According to the invention, since the filter layer is cleaned by forming a swirl stream or a random stream in the water above the surface of the filter layer by the cleaning water jetted from the cleaning water outlets of the filter layer cleaning jet nozzles, the filter material of the filter layer is vigorously stirred by this swirl stream or a random stream. Therefore, while this swirl stream or a random stream is generated, the filter material of the filter layer is stirred and cleaned without interruption whereby the cleaning efficiency per unit time is significantly improved and a high speed filtering can be achieved compared with the prior art water treatment apparatus of the reciprocating cleaning nozzle type by which the filter material is stirred only when the cleaning nozzles pass over the filter material. Further, since this method does not require a large power and a complex mechanism as in the prior art water treatment apparatus of the reciprocating cleaning nozzle type, the manufacturing cost of the apparatus can be saved and the filtering tank can be made in a circular design as viewed in a plan view and, therefore, a water treatment apparatus of a simple, compact design which can be maintained easily can be provided.

In the second aspect of the invention, there is provided a method as defined in the first aspect further comprising a step of jetting out a jet water stream from a part of the filter layer cleaning jet nozzles directed to a central lower portion of the filter layer to form holes in the filter layer.

According to this aspect, by jetting out a jet water stream from a part of the filter layer cleaning jet nozzles directed to a central lower portion of the filter layer to form holes in the filter layer, the filter material of the central lower portion of the filter layer which may not be completely stirred by the swirl stream or random stream can be loosened by forming of the holes by the jet stream and become easily movable and stirred.

In the third aspect of the invention, there is provided a method as defined in the first or second aspect for cleaning a filter layer of a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, said filter layer consisting of an upper layer and a lower layer and said upper layer comprising a filter material which has a smaller specific gravity and a larger particle diameter than a filter material of said lower layer, a filtered water takeout tube provided in the filtering tank for taking out water filtered through the filter layer, a reverse stream cleaning water supply tube provided in the filtering tank for supplying reverse stream cleaning water to the filter layer, a plurality of upper layer cleaning jet nozzles each communicating at one end thereof with an upper layer cleaning water supply tube and having at the other end thereof a cleaning water outlet from which cleaning water is jetted out, said upper layer cleaning jet nozzles being disposed at a predetermined interval above the upper layer of the filter layer in such a manner that the cleaning water outlets are located in the vicinity of the surface of the upper layer, and an overflow outlet provided in the filtering tank above the filter layer, characterized in that the filter layer is cleaned by selectively carrying out a partial cleaning process by which the upper layer is mainly cleaned and a whole cleaning process by which both the upper layer and the lower layer are cleaned wherein said partial cleaning process comprises:

(a) a filter operation interrupting step of suspending supply of raw water while continuing a filter operation to lower the water level of the filtering tank to a predetermined level;

(b) an upper layer cleaning step of causing reverse stream cleaning water to flow from the reverse stream cleaning water supply tube at an upper layer cleaning speed to loosen the filter material of the upper layer by the upward directed reverse stream while jetting out the cleaning water from the cleaning water outlets of the upper layer cleaning jet nozzles to stir and clean the filter material of the upper layer;

(c) a settling step of finishing stirring and cleaning of the filter material of the upper layer and thereby allowing the stirred filter material to settle while continuing supply of the upward directed reverse stream at the upper layer cleaning speed; and (d) a turbid water draining step of draining turbid water containing substances separated from the filter material of the upper layer from the overflow outlet by continuing supply of the upward directed reverse stream at the upper layer cleaning speed, and said whole cleaning process comprises:

(a) a filter operation interrupting step of suspending supply of raw water while continuing a filter operation to lower the water level of the filtering tank to a predetermined level;

(b) a cleaning step of causing reverse stream cleaning water to stream from the reverse stream cleaning water supply tube at a whole layer cleaning speed which is higher than the upper layer cleaning speed to stir the filter material of both the upper layer and the lower layer while jetting out the cleaning water from the cleaning water outlets of the upper layer cleaning jet nozzles to clean the filter material of the upper layer and the lower layer;

(c) a settling step of finishing cleaning of the filter material of the upper layer and the lower layer and thereby allowing the filter material of the upper layer and the lower layer to settle while continuing supply of the upward directed reverse stream at the upper layer cleaning speed; and (d) a turbid water draining step of draining turbid water containing substances separated from the filter material of the upper layer and the lower layer from the overflow outlet by continuing supply of the upward directed reverse stream at the upper layer cleaning speed.

According to this aspect, the filter layer consists of an upper layer and a lower layer and the process of the first aspect is carried out in the upper layer which has a filter material having a smaller specific gravity and a larger particle diameter than the lower layer. Iron which has a high concentration and is caught in the upper layer can be removed by frequently carrying out the partial cleaning process of the upper layer which is a combination of cleaning by the upper layer cleaning jet nozzles and cleaning by the upward reverse stream of a relatively moderate speed whereas manganese which has a low concentration and is caught in the lower layer can be removed with iron by carrying out the whole cleaning process by the upward reverse stream of a high speed at a frequency smaller than the frequency of the partial cleaning process. Accordingly, iron which has a high concentration and tends to be accumulated in a large amount in the upper layer can be sufficiently removed by the frequent partial cleaning process while manganese which has a low concentration and tends to be accumulated in a small amount in the lower layer can be sufficiently removed by less frequent whole cleaning process. Thus, the activity of the microorganism in the lower layer is not likely to be hindered by a frequent cleaning and the highest cleaning effect can be achieved through the entire filter layer and a necessary high speed filtering can be achieved. According to the invention, as compared to the filtering speed of 60 m/day to 120 m/day of the water treatment apparatus of the above publication, a remarkably higher filtering speed of 400 m/day can be achieved. Further, it is not necessary to frequently carry out the whole cleaning process which requires a large amount of reverse cleaning water for removing iron and, as a result, the amount of water used for cleaning can be saved as a whole. In the prior art apparatus using an oxidizing agent or flocculant, about 10% to 15% of filtered water was used for cleaning whereas in the apparatus of the present invention, the amount of cleaning water can be reduced to about 3% to 5% of received water.

Further, according to the invention, since the upper layer which is more frequently cleaned consists of a filter material which has a relatively small specific gravity and a relatively large particle diameter, the filter material is stirred and lifted upwardly during cleaning of the upper layer whereby the cleaning effect is increased and the amount of cleaning water used for cleaning can be held at the minimum. On the other hand, since the lower layer consists of a filter material which has a relatively large specific gravity and a relatively small particle diameter (fine), it has a high capacity of catching substances in raw water and can accurately catch substances which the upper layer has failed to catch. In the whole cleaning process, both the filter material of the upper layer and the filter material of the lower layer are stirred and mixed together but, since the filter material of the lower layer has a larger specific gravity than the filter material of the upper layer, the filter material of the lower layer has a higher settling speed than the filter material of the upper layer and settles at the lower layer before the filter material of the upper layer settles and then the filter material of the upper layer settles upon the filter material of the lower layer. Thus, the original state of the upper layer and the lower layer is restored. By combining the filter material of the upper layer which has a high cleaning capacity and the filter material of the lower layer which has a high microorganism treatment capacity, iron, manganese and other substances (impurities) contained in raw water can be caught sufficiently while the highest cleaning efficiency can be achieved. Moreover, since the upper layer consists of filter material having a relatively large particle diameter, resistance to water is relatively small and hence a high speed filtering can be achieved.

In the fourth aspect of the invention, there is provided a method as defined in the third aspect wherein said partial cleaning process further comprises, after lowering the water level of the filtering tank to a level of a lower portion of the upper layer in the filter operation interrupting step, a step of jetting out a jet water stream from a part of the upper layer cleaning jet nozzles directed to a central lower portion of the upper layer to form holes in the upper layer.

According to this aspect, after lowering the water level of the filtering tank to a level of a lower portion of the upper layer in the filter operation interrupting step, by jetting out a jet water stream from a part of the upper layer cleaning jet nozzles directed to a central lower portion of the upper layer to form holes in the upper layer, the central portion of the upper layer which may not be stirred sufficiently by the swirl stream or random stream can be loosened by the hole formed by the jet stream and become readily movable whereby this portion will be sufficiently stirred and cleaned by the subsequent stirring which is a combination of the swirl stream or random stream and the upward reverse stream.

In the fifth aspect of the invention, there is provided a method as defined in the third or fourth aspect for cleaning a filter layer of a water treatment apparatus further comprising a posterior stage filtering tank provided downstream of the filtered water takeout tube as viewed in the direction of taking out filtered water and housing a posterior stage filter layer comprising a filter material which is the same material as the filter material of the lower layer, said posterior stage filtering tank comprising a filtered water outlet or outlets communicating with the filtered water takeout tube and opening in an upper portion of the posterior stage filtering tank, a filtered water takeout tube for taking out water filtered through the posterior filter layer, a reverse stream cleaning water supply tube for supplying reverse stream cleaning water to the posterior filter layer, a plurality of posterior filter layer cleaning jet nozzles each communicating at one end thereof with a posterior filter layer cleaning water supply tube and having at the other end thereof a cleaning water outlet from which cleaning water is jetted out, said posterior filter layer cleaning jet nozzles being disposed at a predetermined interval above the posterior filter layer in such a manner that the cleaning water outlets are located in the vicinity of the surface of the posterior filter layer, and an overflow outlet provided in the posterior filtering tank above the posterior filter layer, wherein said partial cleaning process comprises:

(a) a filter operation interrupting step of suspending supply of raw water while continuing a filter operation to lower the water level of the filtering tank and the posterior filtering tank to a predetermined level;

(b) an upper layer cleaning step of causing reverse stream cleaning water to flow from the reverse stream cleaning water supply tube at an upper layer cleaning speed to loosen the filter material of the upper layer by the upward directed reverse stream while jetting out the cleaning water from the cleaning water outlets of the upper layer cleaning jet nozzles to stir and clean the filter material of the upper layer;

(c) a settling step of finishing stirring and cleaning of the filter material of the upper layer and thereby allowing the stirred filter material to settle while continuing supply of the upward directed reverse stream at the upper layer cleaning speed; and (d) a turbid water draining step of draining turbid water containing materials separated from the filter material of the upper layer from the overflow outlet by continuing supply of the upward directed reverse stream at the upper layer cleaning speed, and said whole cleaning process comprises:

(a) a filter operation interrupting step of suspending supply of raw water while continuing a filter operation to lower the water level of the filtering tank and the posterior filtering tank to a predetermined level;

(b) a cleaning step of causing reverse stream cleaning water to flow from the respective reverse stream cleaning water supply tubes of the filtering tank and the posterior filtering tank at a whole layer cleaning speed which is higher than the upper layer cleaning speed to stir the filter material of the upper layer, the lower layer and the posterior filter layer while jetting out the cleaning water from the respective cleaning water outlets of the upper layer cleaning jet nozzles and the posterior filter layer cleaning jet nozzles to clean the filter material of the upper layer, the lower layer and the posterior filter layer;

(c) a settling step of finishing cleaning of the filter material of the upper layer, the lower layer and the posterior filter layer and thereby allowing the filter material of the upper layer, the lower layer and the posterior filter layer to settle while continuing supply of the upward directed reverse stream at the upper layer cleaning speed; and (d) a turbid water draining step of draining turbid water containing substances separated from the filter material of the upper layer, the lower layer and the posterior filter layer from the respective overflow outlet of the filtering tank and the posterior filtering tank by continuing supply of the upward directed reverse stream at the upper layer cleaning speed.

According to this aspect, in a case where concentration of manganese is so high that the filter material of the lower layer cannot catch manganese sufficiently, reverse stream water is caused to flow from the reverse stream cleaning water supply tube of the filtering tank and the reverse stream cleaning water tube of the posterior stage filtering tank at the whole cleaning speed which is higher than the upper layer cleaning speed to stir the filter materials of the upper layer, lower layer and filter layer of the posterior stage filtering tank while jetting out cleaning water from the cleaning water outlets of the upper layer cleaning jet nozzles and the posterior stage filter layer cleaning jet nozzles to clean the filter materials of the upper layer, lower layer and filter layer of the posterior stage filtering tank. By this operation, manganese of a high concentration in raw water can be removed sufficiently.

In the sixth aspect of the invention, there is provided a method as defined in any of the third to fifth aspects further comprising a step of measuring resistance value of the filtering tank during a normal filter operation and automatically starting the partial cleaning process when the resistance value has exceeded a predetermined value.

According to this aspect, by measuring resistance value of the filtering tank during a normal filter operation and automatically starting the partial cleaning process when the resistance value has exceeded a predetermined value, when blocking of the filter material has occurred in the upper layer to a degree at which cleaning is necessary, the partial cleaning can be automatically started whereby the partial cleaning process can be carried out more efficiently than in a case where the partial cleaning process is carried out according to a preset schedule.

In the seventh aspect of the invention, there is provided a method as defined in any of the third to fifth aspects further comprising a step of measuring resistance value of the filtering tank during a normal filter operation and starting the partial cleaning process when the resistance value has reached a predetermined value and, when time elapsed from finishing of the partial cleaning process till a time point at which the resistance value of the filtering tank has reached the predetermined value becomes less than a predetermined period of time, automatically starting the whole cleaning process.

According to this aspect, by measuring resistance value of the filtering tank during a normal filter operation and starting the partial cleaning process when the resistance value has reached a predetermined value and, when time elapsed from finishing of the partial cleaning process till a time point at which the resistance value of the filtering tank has reached the predetermined value becomes less than a predetermined period of time, automatically starting the whole cleaning process, the whole cleaning process can be started automatically and the filter layer can be maintained always in a desirable state by only measuring resistance value of the filtering tank.

In the eighth aspect of the invention, there is provided a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, a filtered water takeout tube provided in the filtering tank for taking out water filtered through the filter layer, a reverse stream cleaning water supply tube provided in the filtering tank for supplying reverse stream cleaning water to the filter layer, a plurality of filter layer cleaning jet nozzles each communicating at one end thereof with a filter layer cleaning water supply tube and having at the other end thereof a cleaning water outlet from which cleaning water is jetted out, and an overflow outlet provided in the filtering tank above the filter layer, characterized in that said filtering tank is substantially circular in a plan view and said filter layer cleaning jet nozzles are disposed at a predetermined interval above the filter layer with the cleaning water outlets being located in the vicinity of the surface of the filter layer in such a manner that a swirl stream or a random stream is formed in the water above the surface of the filter layer by the cleaning water jetted from the cleaning water outlets of the filter layer cleaning jet nozzles.

According to this aspect, there can be provided a water treatment apparatus which can perform the advantageous result of the method of the first aspect.

In the ninth aspect of the invention, there is provided a water treatment apparatus as defined in the eighth aspect wherein the filter layer cleaning jet nozzles are opened in the filtering tank obliquely downwardly from the inner surface of the filtering tank at a predetermined angle from the radial direction of the filtering tank in a plane parallel to the surface of the filter layer, and each of the filter layer cleaning jet nozzles has an air inlet tube which communicates at one end thereof with an air supply source and opens at the other end thereof in the filter layer cleaning jet nozzle at a location upstream of the cleaning water outlet.

According to this aspect, a desired swirl stream or random stream can be formed efficiently with a simple mechanism.

In the tenth aspect of the invention, there is provided a water treatment apparatus as defined in the eighth or ninth aspect wherein a part of the filter layer cleaning jet nozzles are disposed at a predetermined interval above the filter layer with the cleaning water outlets located in the vicinity of the surface of the filter layer and directed to a central lower portion of the filter layer in a manner to jet out a jet water stream to form holes in the filter layer.

According to this aspect, the process of the second aspect can be achieved efficiently with a simple mechanism.

In the eleventh aspect of the invention, there is provided a water treatment apparatus as defined in any of the eighth to tenth aspects further comprising means for supplying additional dissolved oxygen to the filter layer.

According to this aspect, when raw water contains ammoniac nitrogen in a high concentration, by supplying additional dissolved oxygen to the filter layer, the ammoniac nitrogen can be oxidized with this additional dissolved oxygen and thereby removed from the raw water.

In the twelfth aspect of the invention, there is provided a water treatment apparatus as defined in any of the eighth to eleventh aspects comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, said filter layer consisting of an upper layer and a lower layer and said upper layer comprising a filter material which has a smaller specific gravity and a larger particle diameter than a filter material of said lower layer, a filtered water takeout tube provided in the filtering tank for taking out water filtered through the filter layer, a reverse stream cleaning water supply tube provided in the filtering tank for supplying reverse stream cleaning water to the filter layer, a plurality of upper layer cleaning jet nozzles each communicating at one end thereof with an upper layer cleaning water supply tube and having at the other end thereof a cleaning water outlet from which cleaning water is jetted out, and an overflow trough provided in the filtering tank above the filter layer.

According to this aspect, a water treatment apparatus which can perform the advantageous result of the method of the third aspect can be provided.

In the thirteenth aspect of the invention, there is provided a water treatment apparatus as defined in the twelfth aspect further comprising a posterior stage filtering tank provided downstream of the filtered water takeout tube as viewed in the direction of taking out filtered water and housing a posterior filter layer comprising a filter material which is the same material as the filter material of the lower layer, said posterior stage filtering tank comprising a filtered water outlet or outlets communicating with the filtered water takeout tube and opening in an upper portion of the posterior stage filtering tank, a filtered water takeout tube for taking out water filtered through the posterior filter layer, a reverse stream cleaning water supply tube for supplying reverse stream cleaning water to the posterior filter layer, a plurality of posterior filter layer cleaning jet nozzles each communicating at one end thereof with a posterior filter layer cleaning water supply tube and having at the other end thereof a cleaning water outlet from which cleaning water is jetted out, said posterior filter layer cleaning jet nozzles being disposed at a predetermined interval above the posterior filter layer in such a manner that the cleaning water outlets are located in the vicinity of the surface of the posterior filter layer, and an overflow outlet provided in the posterior filtering tank above the posterior filter layer.

According to this aspect, a water treatment apparatus performing the advantageous result of the method of the fifth aspect can be provided.

In the fourteenth aspect of the invention, there is provided a water treatment apparatus as defined in any of the eighth to thirteenth aspects wherein the filtered water takeout tube and the reverse stream cleaning water supply tube respectively consist of a plurality of water collecting and distributing pipes disposed in parallel in a bottom portion of the filtering tank and each of the water collecting and distributing pipes consists of an outer cylindrical screen and an inner perforated pipe, said inner perforated pipe having water collecting and distributing holes formed in the axial direction of the inner perforated pipe on both sides thereof.

According to this aspect, by providing in the bottom portion of the filtering tank water collecting and distributing pipes each consisting of a cylindrical screen and an inner perforated tube, even in a case where concentration of manganese in raw water is high, manganese is deposited only on the surface of the cylindrical screen of the water collecting and distributing pipe and, therefore, the cylindrical screen only may be taken out of the filtering tank and cleaned for removing the deposited manganese whereby cleaning of the bottom portion of the filtering tank can be finished with only a simple work.

BRIEF DESCRIPTION OF THE DRAWINGS

In the accompanying drawings,

FIGS. 8A and 8B are views showing an example of water collecting and distributing pipe used in the water treatment apparatus of FIG. 7 wherein FIG. 8A is a side view and FIG. 8B is a plan view;

DESCRIPTION OF PREFERRED EMBODIMENTS

Preferred embodiments of the invention will now be described with reference to the accompanying drawings.

The present invention can be applied not only to a water treatment apparatus comprising two filter layers of an upper layer and a lower layer but also to a water treatment apparatus comprising a single filter layer. In the following description, description will be made about a preferred embodiment of a water treatment apparatus having two filter layers of an upper layer and a lower layer.

Figure 1:
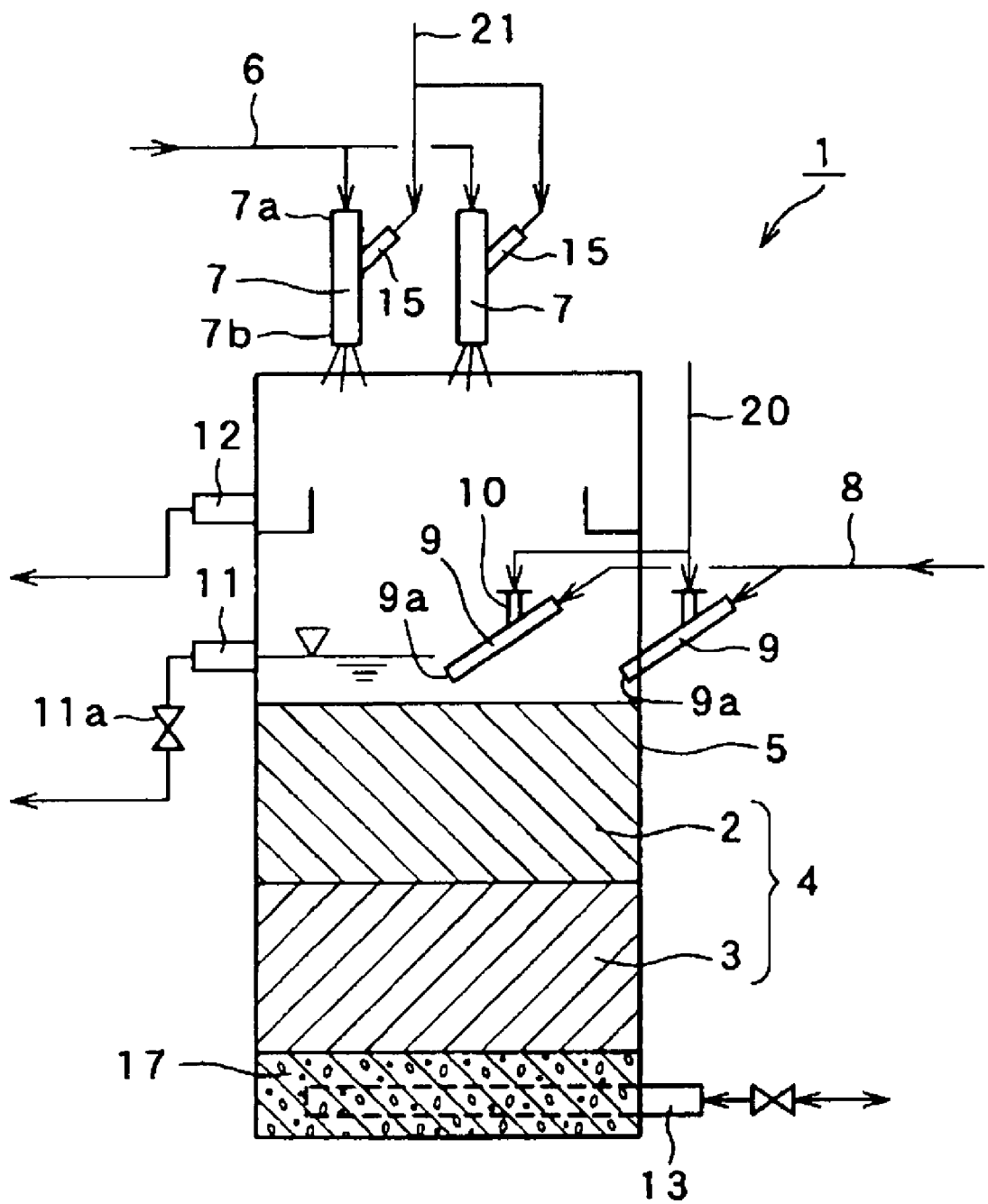
FIG. 1 is a schematic diagram showing an embodiment of the water treatment apparatus made according to the invention.
Figure 2:
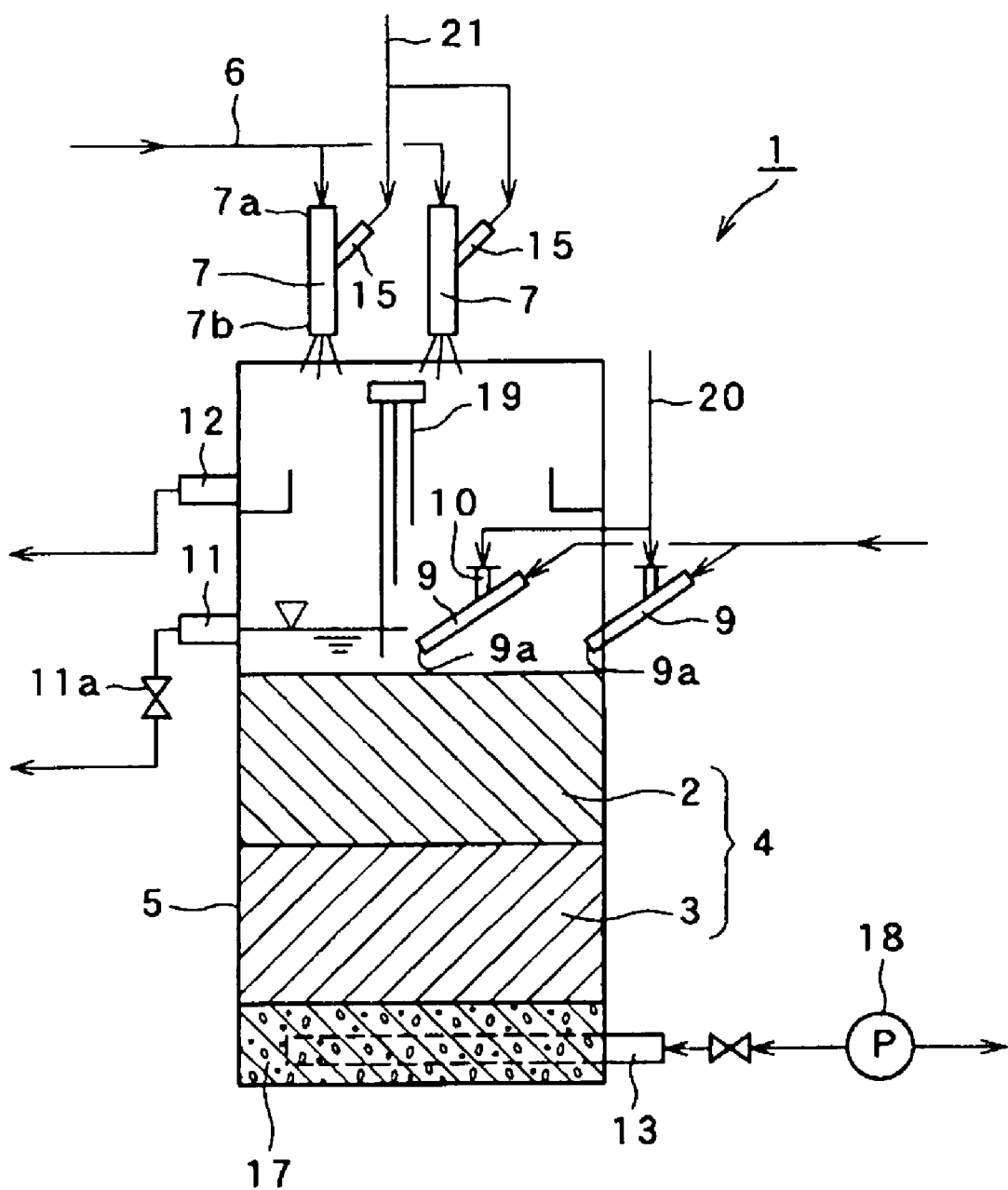
FIG. 2 is a schematic diagram showing another embodiment of the water treatment apparatus made according to the invention.
Figure 3:
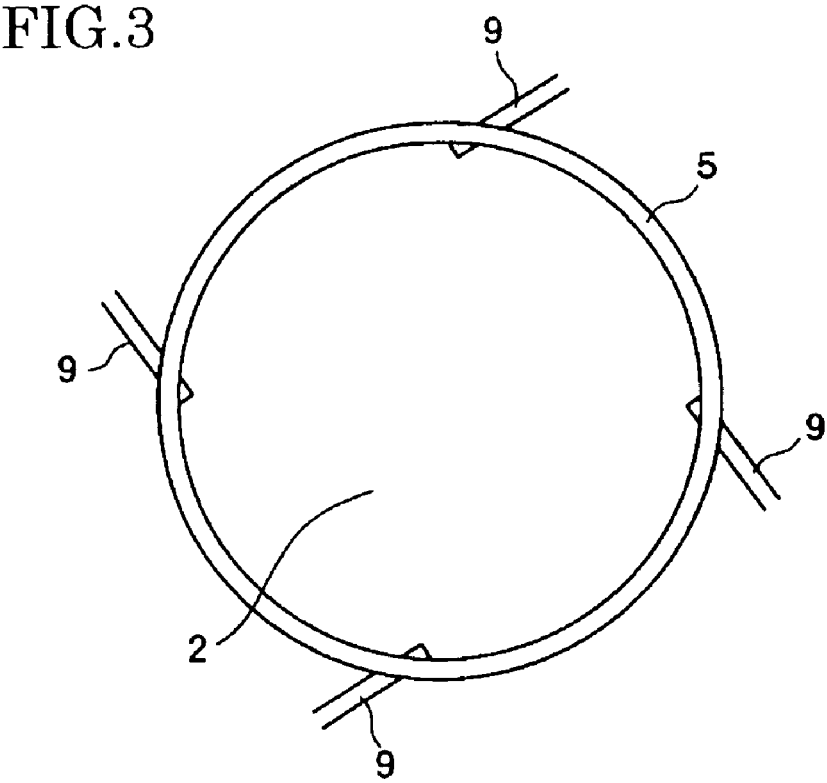
FIG. 3 is a plan view showing arrangement of upper layer cleaning jet nozzles.

FIG. 1 is a diagram showing schematically an embodiment of the water treatment apparatus of the invention. FIG. 2 is a diagram showing schematically another embodiment of the water treatment apparatus. FIG. 3 is a plan view showing disposition of upper layer cleaning jet nozzles used in the embodiments of FIGS. 1 and 2.

In FIG. 1, A water treatment apparatus 1 comprises, as main component elements, a filtering tank 5 housing a filter layer 4 consisting of an upper layer 2 and a lower layer 3, a raw water supply tube 6, mixed raw water stream jet nozzles 7, an upper layer cleaning water supply tube 8, upper layer cleaning jet nozzles 9, air inlet tubes 10, an overflow outlet 11 for lowering the water level, an overflow outlet comprising a trough or hole 12 and a water collecting and distributing pipe 13 which is used concurrently as a filtered water takeout tube and a reverse stream cleaning water supply tube.

The raw water supply tube 6 made of a steel tube for supplying raw water such as underground water to be filtered to the filtering tank 5 is connected to a water supply pump (not shown) and this water supply pump is supplied with raw water from a raw water source through a water tank (not shown) which is provided if necessary and supplies the raw water to the raw water supply tube 6 at a predetermined flow speed.

The raw water supply tube 6 is provided above the tope of the filtering tank 5 in a plane parallel to the surface of the filter layer 4.

One or a plurality (two in the illustrated embodiment) of mixed raw water stream jet nozzles 7 are provided in a manner to branch off vertically from the raw water supply tube 6. The upstream end portion 7a of each jet nozzle 7 is fitted in the raw water supply tube 6 to communicate with the raw water supply tube 6 and the downstream end portion 7b constitutes a raw water outlet from which the raw water is jetted out. A preferable inner diameter of the mixed raw water stream jet nozzle 7 is, for example, within a range from about 3 mm to 6 mm.

In the mixed raw water stream jet nozzles 7, the same number (two in the illustrated embodiment) of air inlet tubes 15 are provided. The upstream end portion of each air inlet tube 15 projects obliquely upwardly from the mixed raw water stream jet nozzle 7 to communicate with an air supply tube 21 and the downstream end portion of the air inlet tube 15 opens in the mixed raw water stream jet nozzle 7 in a portion upstream of the raw water outlet 7b. A preferable inner diameter of the air inlet tube 15 is, for example, in the range from about 1 mm to 10 mm.

In the filtering tank 5, the upper layer 2 of the filter layer 4 is disposed below the mixed raw water stream jet nozzles 7 with a predetermined distance between the surface of the upper layer 2 and the raw water outlets 7b of the nozzles 7. It is necessary that the filter material filled in the upper layer 2 of the filter layer 4 should have a specific gravity which is smaller than the specific gravity of the filter material filled in the lower layer 3 and have a particle diameter which is larger than the particle diameter of the filter material filled in the lower layer 3. It has been found that, as a filter material of the upper layer satisfying these conditions, zeolite, for example, is a preferable material and particularly, zeolite having a particle diameter of about 1.2 mm is preferable. As a filter material of the lower layer satisfying these conditions, filtering sand having a particle diameter of about 0.6 mm is preferable. The filter layer 4 performs the function of filtering raw water by catching oxide flocks and other substances in raw water supplied from the jet nozzles 7 as jet streams and also performs the function of oxidizing and adsorbing iron and adsorbing manganese by the action of microorganism such as iron bacteria which lives in the filter layer. More specifically, iron is mainly adsorbed in the form of a film to the filter material in the surface portion of the upper layer 2 by autocatalytic reaction of iron oxihydroxide (mostly in a portion about 200 mm deep from the surface of the filter layer) whereas manganese is mainly adsorbed on the surface of particles of the filtering sand by the action of microorganism in the lower layer 3 (mostly in a portion about 500 mm to 800 mm deep from the surface of the filter layer).

The filter layer 4 is supported by the gravel layer 17. The gravel layer 17 is preferably made of a layer of gravel of a small diameter, a layer of gravel of a medium diameter and a layer of gravel of a large diameter downwardly from the above but is not limited to this structure.

Figure 4:
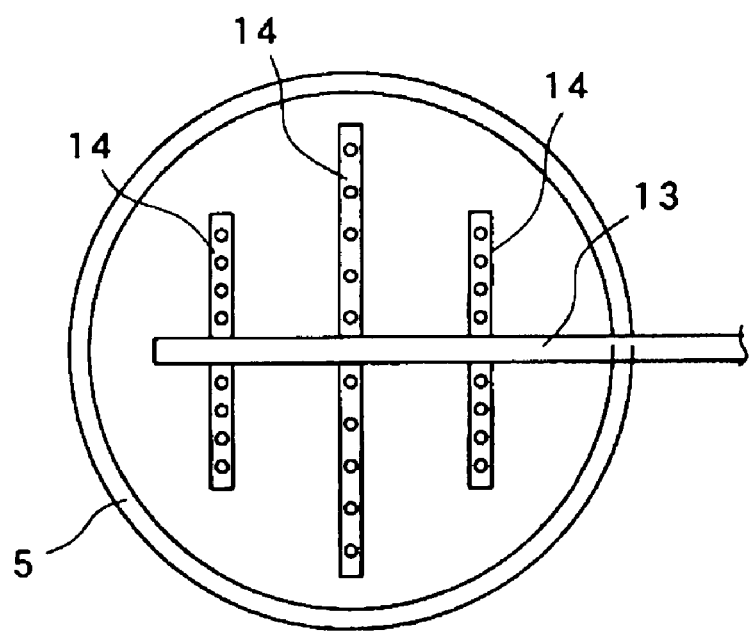
FIG. 4 is a sectional plan view showing arrangement of a water collecting and distributing pipe in a support gravel layer.

In the central portion of the gravel layer 17 of the filtering tank 5, a water collecting and distributing pipe 13 is disposed in a parallel direction. In the present embodiment, the water collecting and distributing pipe 13 is used concurrently as a filtered water takeout tube for taking out water filtered through the filter layer 4 and a reverse stream cleaning water supply tube for supplying reverse stream cleaning water to the filter layer 4. As shown in FIG. 4, a plurality of brach tubes 14 are connected to the water collecting and distributing pipe 13 in a manner to branch off from the pipe 13 in communication with the pipe 13 and extending in parallel to the pipe 13. The structure of the filtered out takeout tube and the reverse stream cleaning water supply tube is not limited to this but a filtered water takeout tube and a reverse stream cleaning water may be provided separately from each other.

A plurality of upper layer cleaning jet nozzles 9 are provided above the surface of the upper layer 2 in the filtering tank 5 with a predetermined interval between the respective jet nozzles 9 in circumferential direction. Each of the upper layer cleaning jet nozzles 9 is communicated at one end thereof with the upper layer cleaning water supply tube 8 and has at the other end thereof a cleaning water outlet 9a from which cleaning water is jetted out. Each cleaning water outlet 9a is located in the vicinity of the surface of the upper layer 2 above the upper layer 2. As the upper layer cleaning nozzles 9, it is possible to use nozzles used in the prior art water treatment apparatus which extend vertically to the surface of the upper layer 2 but it is preferable to use nozzles which are opened, as shown in FIG. 3, in the filtering tank obliquely downwardly from the inner surface of the filtering tank at a predetermined angle from the radial direction of the filtering tank in a plane parallel to the surface of the upper layer 2. Each of the upper layer cleaning jet nozzles 9 has a air inlet tube 10 which communicates at one end thereof with an air supply tube 20 and opens at the other end thereof in the upper layer cleaning jet nozzle 9 at a location upstream of the cleaning water outlet 9a. The upper end of the air inlet tube 10 may be communicated with atmosphere instead of communicating with the air supply tube 20.

In the above described embodiment, the upper layer cleaning jet nozzles 9 open in the same direction in the filtering tank 5 and thereby produce a swirl stream flowing in the same direction. The invention is not limited to this but the direction of opening of a part of the upper layer cleaning jet nozzles may be made different from the direction of opening of other upper layer cleaning jet nozzles so that a random stream will be produced. Further, the arrangement of the upper layer cleaning jet nozzles is not limited to a single stage as shown in the above described embodiment but the upper layer cleaning jet nozzles may be provided in plural stages in vertical direction and a jet steam may be jetted out from the upper layer cleaning jet nozzles at the lower stage into the inner portion of the upper layer. For jetting out a jet stream from the jet nozzles 9, a pressure pump may be used instead of the air inlet tube 10 to generate pressurized water and supply this pressurized water to the jet nozzles 9.

In a portion of the filtering tank 5 above the surface of the upper layer 2, there is provided the overflow outlet 11 such as an overflow trough or hole for lowering the water level to be treated by the filter layer 4. In a portion of the filtering tank 5 above the overflow outlet 11, there is provided an overflow outlet 12 such as an overflow trough or hole 12 for draining overflow water during reverse stream cleaning. For draining overflow water during the reverse stream cleaning, not only a trough or hole but other shape of outlet means may be used.

Description will now be made about the operation of the water treatment apparatus of FIG. 1.

During filtering of raw filter, raw water is supplied from a water supply pump to the mixed raw water stream jet nozzles 7 through the raw water supply tube 6 while depth of water above the surface of the upper layer 2 is maintained at a predetermined value. The raw water is turned to a jet water stream by setting the flow speed of the water stream flowing through the jet nozzles 7 to, e.g., 1.5 l per minute to 3 l per minute while air is sucked into the jet nozzles 7 through the air inlet tubes 15 at a flow speed of, e.g., 0.5 l per minute to 1 l per minute. By this structure, the jet stream turns air to a multitudes of small air bubbles and the mixed raw water jet stream containing a multitudes of air bubbles is jetted out of the raw water outlets 7b of the jet nozzles 7 onto the surface of the water above the upper layer 2 thereby causing a vehement aeration to occur on the surface of the water and also in the water. By this aeration, insoluble substances such as iron are oxidized and become soluble and form flocks or precipitate. Among the soluble substances, iron is mainly caught on the surface of particles of the filter material such as zeolite which forms the upper layer 2 whereas manganese is mainly caught on the surface of particles of the filter material such as filtering sand which forms the lower layer 3 by activity of the microorganism. The raw water which has thus been filtered through the filter layer 4 and removed of the insoluble substances and other foreign matters is taken out of the water collecting and distributing pipe 13 which functions as the filtered water takeout tube.

As the above described filtering operation is continued, flocks of oxides and other foreign matter are accumulated in the surface portion of the upper layer 2 with lapse of time and the surface portion of the upper layer 2 is covered with the flocks and other foreign matter which block gaps between the particles of the filter material and thereby reduce the filtering function of the filter layer 4. As the surface portion of the upper layer 2 is gradually blocked, the water level of the water above the surface of the upper layer 2 is gradually raised. When the water level has reached a predetermined value, either one of the partial cleaning process or the whole cleaning process described below is selected and the selected cleaning process is carried out.

Partial Cleaning Process (1) A filter operation interruption step is carried out by suspending supply of raw water while continuing a filter operation until the water level is lowered to the vicinity of the surface of the upper layer 2 or to a predetermined height of the upper layer 2 or the water level is lowered by draining water by the overflow outlet 11. If, during reverse stream cleaning, cleaning water from the cleaning water outlets 9a of the upper layer cleaning nozzles 9 and reverse stream cleaning water supplied from the reverse stream cleaning water supply tube 13 overflow and flow out from the overflow outlet 12, the filter material of the upper layer 2 also is likely to flow out of the overflow outlet 12. For preventing such flow out of the filter material, it is necessary to lower the water level above the surface of the upper layer 2 to as low a level as possible before starting the reverse stream cleaning.

(2) During reverse stream cleaning, an upper layer cleaning step is carried out by causing reverse stream cleaning water to flow from the water collecting and distributing tube 13 which functions as the reverse stream cleaning water supply tube at an upper layer cleaning speed (e.g., 5-30 m/h) to loosen the filter material of the upper layer 2 by the upward directed reverse stream while jetting out the cleaning water from the cleaning water outlets 9a of the upper layer cleaning jet nozzles 9 to clean the filter material of the upper layer 2. At this time, an opening and closing valve 11a of the water level lowering overflow outlet 11 is closed. By supplying the reverse stream cleaning water at the upper layer cleaning speed which is a relatively low speed, the filter material of the upper layer 2 becomes movable easily and stirring and cleaning of the filter material by the jet water jetted out of the upper layer cleaning jet nozzles 9 can thereby be enhanced. The upper layer cleaning step is finished before the water level reaches the level of the overflow outlet 12.

(3) After finishing the stirring and cleaning of the filter material of the upper layer 2, a settling step for settling the filter material of the upper layer 2 which has been stirred is carried out.

(4) A turbid water draining step is carried out by draining turbid water containing iron caught mainly in the upper layer 2 from the overflow outlet 12 by causing the reverse stream cleaning water to flow from the water collecting and distributing pipe 13 at the upper layer cleaning speed and cleaning the filter materials of the upper layer 2 and the lower layer 3 by the upward directed reverse stream water.

Whole Cleaning Process (1) A filter operation interruption step is carried out by suspending supply of raw water while continuing a filter operation until the water level is lowered to the vicinity of the surface of the upper layer 2 or to a predetermined height of the upper layer 2 or the water level is lowered by draining water by the overflow outlet 11.

(2) A cleaning step is carried out by causing reverse stream cleaning water to flow from the water collecting and distributing pipe 13 at a whole layer cleaning speed (e.g., 30 m/h to 60 m/h) which is higher than the upper layer cleaning speed to stir the filter material of both the upper layer 2 and the lower layer 3 while jetting out the cleaning water from the cleaning water outlets 9a of the upper layer cleaning jet nozzles 9 to clean the filter material of the upper layer 2 and the lower layer 3.

(3) A settling step is carried out by finishing cleaning of the filter material of the upper layer 2 and the lower layer 3 and thereby allowing the filter material of the upper layer 2 and the lower layer 3 to settle while continuing supply of the upward directed reverse stream at the upper layer cleaning speed.

(4) A turbid water draining step is carried out by draining turbid water containing substances separated from the filter material of the upper layer 2 and the lower layer 3 from the overflow outlet 12 by continuing supply of the upward directed reverse stream at the upper layer cleaning speed.

For determining which of the partial cleaning process and the whole cleaning process should be selected, frequency of the partial cleaning process and frequency of the whole cleaning process are determined in accordance with the ratio of concentration of iron and concentration of manganese and with the filtering speed and the partial cleaning process and the whole cleaning process are conducted according to the respective frequency thus determined.

FIG. 2 is a diagram schematically showing another embodiment of the water treatment apparatus made according to the invention. In the embodiment of FIG. 2, the same component parts as those used in the embodiment of FIG. 1 are designated by the same reference characters and description thereof will be omitted.

In the embodiment of FIG. 2, a pump 18 is connected to the water collecting and distributing pipe 13 to suck and take out filtered water. In the upper portion of the filtering tank 5, a water level meter 19 is provided for measuring water level above the surface of the upper layer 2.

The pump 18 is controlled in the following manner. First, the amount of water to be treated by this pump 18 per unit time is set at a value which is somewhat larger than the amount of supply of raw water. As the filter operation is continued, the water level of the water above the upper layer 2 is gradually lowered. This water level is measured by the water level meter 19 and, when the water level has been lowered to a predetermined level, the operation of the pump 18 is temporarily suspended until the water level rises to a predetermined level. Upon rising of the water level to this level, the pump 18 is operated again and the above operation is continued repeatedly.

Conversely, the amount of water to be treated by the pump 18 per unit time may be set at a value which is somewhat smaller than the amount of supply of raw water. When the water level has risen to a predetermined level, supply of raw water is temporarily suspended until the water level is lowered to a predetermined level. Upon lowering of the water level to this level, supply of raw water is resumed and this operation is continued repeatedly.

Figure 5:
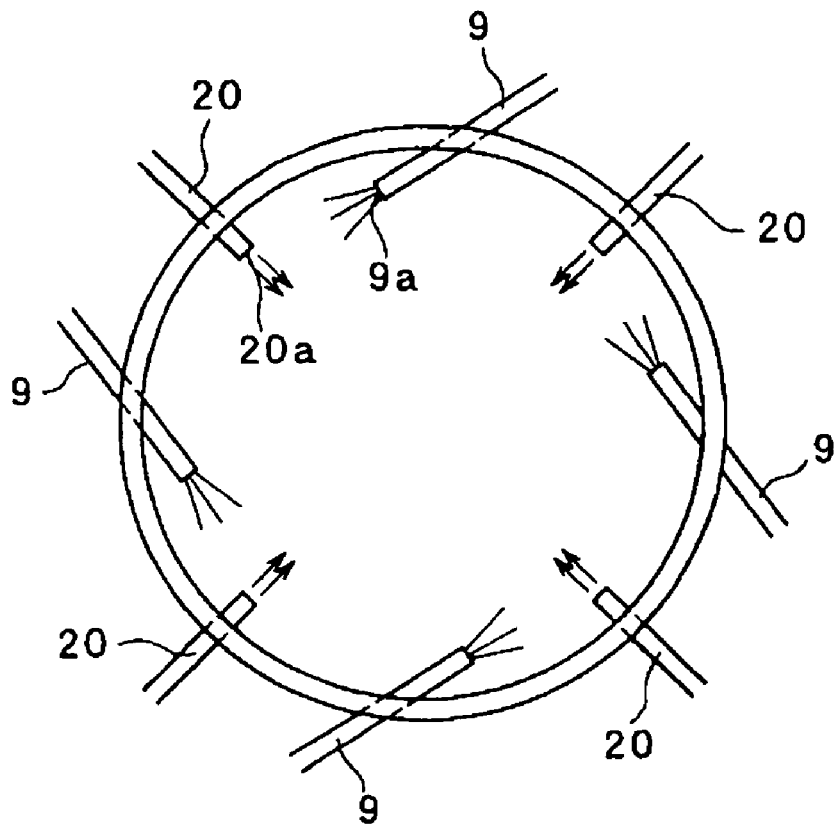
FIG. 5 is a schematic plan view showing another embodiment of the water treatment apparatus.
Figure 6:
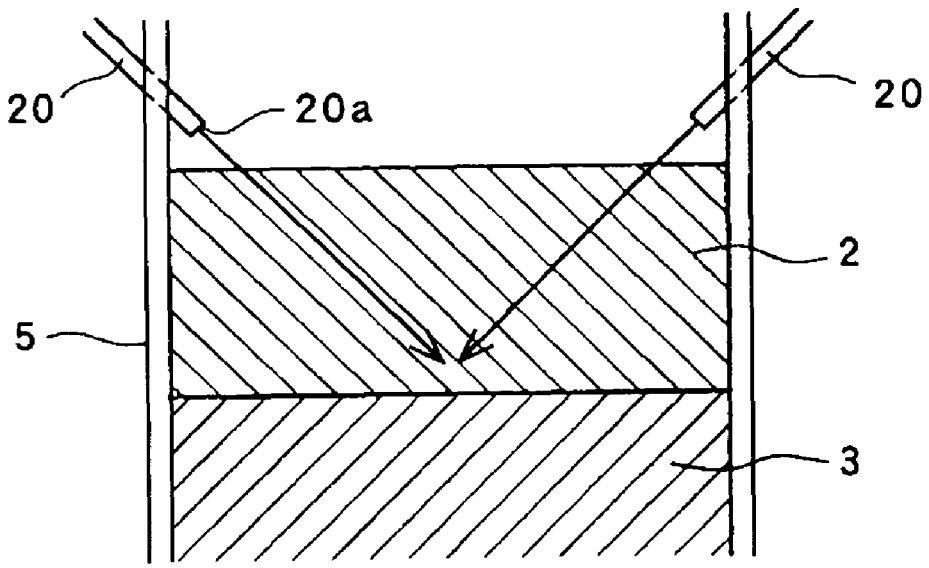
FIG. 6 is a vertical sectional view showing an operation of the embodiment of FIG. 5.

Another embodiment of the water treatment apparatus and cleaning method will be described with reference to FIGS. 5 and 6. FIG. 5 is a plan view of this embodiment and FIG. 6 is a partial sectional view schematically showing operation of center hole forming nozzles. In the embodiment of FIGS. 5 and 6, the same component parts as those of the embodiment of FIGS. 1 and 2 are designated by the same reference characters and description thereof will be omitted.

In this embodiment, as shown in FIG. 5, the upper layer cleaning jet nozzles comprise swirl forming nozzles 9 and center hole forming nozzles 20. The swirl forming nozzles 9 which constitute a part of the upper layer cleaning jet nozzles perform the same function as the upper layer cleaning jet nozzles 9 of the embodiments shown in FIGS. 1 and 2. In this embodiment, a plurality (four in the illustrated example) of the center hole forming nozzles 20 which constitute the other part of the upper layer cleaning jet nozzles are provided at an equal distance in the circumferential direction of the filtering tank 5 between the swirl forming nozzles 9. Each of the center hole forming nozzles 20 is communicated at one end thereof with the upper layer cleaning water supply tube 8 and has, at the other end thereof, a cleaning water outlet 20a from which cleaning water is jetted out. The cleaning water outlet 20a is located in the vicinity of the surface of the upper layer 2. The cleaning water outlet 20a of each center hole forming nozzle 20 is opened, as shown in FIG. 6, in such a direction that the water stream jetted out of the cleaning water outlet 20a will reach the central lower portion of the upper layer 2.

In this embodiment, when the upper layer is cleaned, the water level of the filtering tank 5 is lowered to the lower portion of the upper layer 2 and then, simultaneously with or prior to start of the operation of the swirl forming nozzles 9, the operation of the center hole forming nozzles 20 is started to form holes in the upper layer 2 by injecting the jet stream toward the central lower portion of the upper layer 2.

Then, the upward directed reverse water stream is caused to flow at the partial cleaning speed to loosen the filter material of the upper layer 3 and the loosened filter material is stirred by the swirl stream formed by the swirl forming nozzles 9. The operation of the center hole forming nozzles 20 may be stopped after starting of the upwardly directed reverse water stream and during the operation of the swirl forming nozzles 9. By forming holes in the central portion of the upper layer 2, the filter material of the central portion of the upper layer 2 is loosened and becomes easily movable whereby it can be stirred sufficiently by the swirl stream produced by the swirl forming nozzles 9.

According to this embodiment, since the upper layer cleaning jet nozzles comprise the center hole forming nozzles 20 and the swirl forming nozzles 9, by suitably combining the operation timing of these two kinds of nozzles and starting timing and speed of the upwardly directed reverse water stream, maximum cleaning efficiency can be achieved with the shortest time and minimum amount of water.

The type of the upper layer cleaning jet nozzles is not limited to the above described two types but, if necessary, other type of nozzle such as a third nozzle for forming a hole in an intermediate portion between the peripheral portion and the central portion of the upper layer 2 may be provided.

In another embodiment of the invention, resistance value of the filtering tank 5 during normal filter operation is measured and, when this resistance value has exceeded a predetermined value, the partial cleaning process is started. For measuring the resistance value, differential pressure of the filtering tank 5 may be measured by a differential pressure meter or, alternatively, when the water level measured by a water level meter has reached a predetermined value, this water level may be regarded to be a predetermined resistance value. By this arrangement, when blocking has occurred in the upper layer of the filter layer to the extent that cleaning is necessary, the partial cleaning process is started automatically and, accordingly, the partial cleaning process can be performed more efficiently than in the case where the partial cleaning process is performed according to a predetermined schedule.

As another way of cleaning, the partial cleaning process is performed when the resistance value of the filtering tank 5 has reached a predetermined value (it may be performed automatically or the predetermined time may be measured from time to time) and, when time elapsed from finishing of the partial cleaning process till a time point at which the resistance value of the filtering tank has reached a predetermined value becomes less than a predetermined period of time, the whole cleaning process is automatically started.

Figure 11:
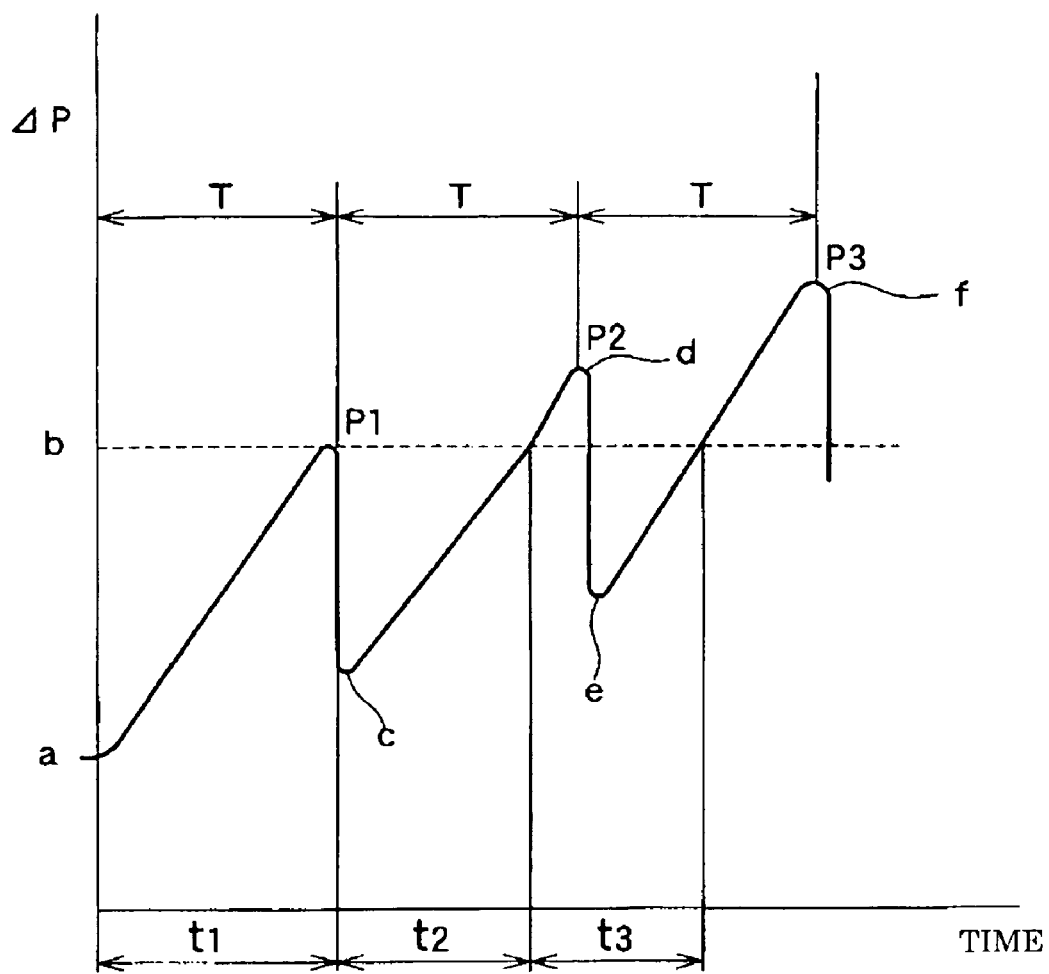
FIG. 11 is a graph showing relationship between time and resistance value (differential pressure value) $\Delta p$ of the filtering tank in a case where the partial cleaning process is performed each time when a set period of time has elapsed.

FIG. 11 is a graph which shows relationship between time and resistance value (differential pressure value) $\Delta p$ of the filtering tank in which the horizontal axis shows time and vertical axis shows resistance value. The curve shows change of the resistance value $\Delta p$ in a case where a partial cleaning process is performed at a constant time interval T. In FIG. 11, if, in each partial cleaning process, time required for the resistance value $\Delta p$ to reach a predetermined value b is counted, this time changes as follows: Assuming that initial resistance value at start of the filter operation is a, resistance value at initial partial cleaning process P1 is the predetermined value b and time elapsed till reaching of the predetermined resistance value is t1, the resistance value drops to c by the initial partial cleaning process P1. Since, however, the resistance value does not drop to the initial value a, time t2 which is elapsed till reaching of the resistance value to the predetermined value b by next filter operation is shorter than t1. The resistance value drops to e by the second partial cleaning process P2 but this resistance value is higher than c. Time t3 which is elapsed till reaching of the resistance value to the predetermined value b by next filter operation is shorter than t2.

Therefore, by performing the partial cleaning process each time the resistance value has reached the predetermined value b, measuring time t1, t2 and t3 elapsed for the resistance value $\Delta p$ to reach the predetermined value b after each partial cleaning process during normal filter operation, and automatically starting the whole cleaning process when time t3 elapsed for the resistance value to become the predetermined value b after the second partial cleaning process and before the last partial cleaning process is shorter than a predetermined period of time Ta, the whole cleaning process can be effectively performed to maintain the filter layer always in a desirable stage in a simple manner by only measuring the predetermined value b.

Figure 7:
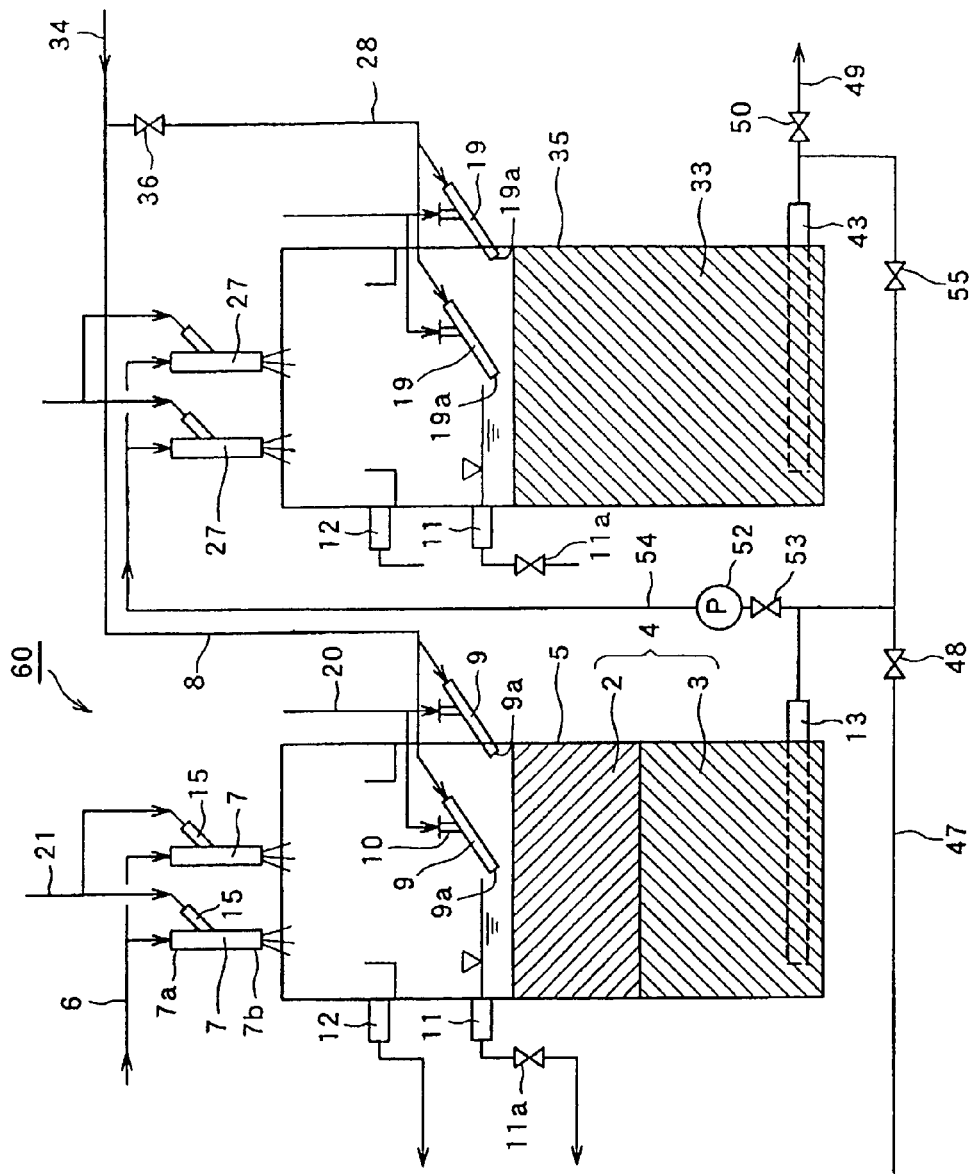
FIG. 7 is a schematic diagram showing another embodiment of the water treatment apparatus.

FIG. 7 shows another embodiment of the water treatment apparatus of the invention for carrying out the method of the invention. This cleaning method is one which can remove manganese in raw water sufficiently even in a case where the concentration of manganese in raw water is so high that it is difficult to remove manganese sufficiently by the apparatus shown in FIG. 1 or 2. In the apparatus of FIG. 7, the same component parts as those of FIG. 1 are designated by the same reference characters and description thereof will be omitted.

In this water treatment apparatus 90, there is provided, on the downstream side of the water collecting and distributing pipe 13 of the apparatus of FIG. 1, a posterior stage filtering tank 35 which houses a posterior filter layer 33 consisting of the same filter material as the filter material of the lower layer 3. The posterior stage filter tank 35 comprises a filtered water outlet or outlets 27 communicating with the water collecting and distributing pipe 13 functioning as the filtered water takeout tube and opening in an upper portion of the posterior stage filtering tank 35 above the posterior stage filter layer 33, a water collecting and distributing pipe 43 functioning as a filtered water takeout tube for taking out water filtered through the posterior filter layer 33 and a reverse stream cleaning water supply tube for supplying reverse stream cleaning water to the posterior filter layer 33, a plurality of posterior filter layer cleaning jet nozzles 19 each communicating at one end thereof with a posterior filter layer cleaning water supply tube 28 and having at the other end thereof a cleaning water outlet 19a from which cleaning water is jetted out, the posterior filter layer cleaning jet nozzles 19 being disposed at a predetermined interval above the posterior filter layer 33 in such a manner that the cleaning water outlets 19a are located in the vicinity of the surface of the posterior filter layer 33, and an overflow outlet 12 consisting of an overflow trough or hole etc. provided in the posterior filtering tank 35 above the posterior filter layer 33. Since the structures of the filtered water outlets 27 and the posterior filter layer cleaning jet nozzles 19 are the same as the mixed raw water stream jet nozzles 7 and the upper layer cleaning jet nozzles 9, description thereof will be omitted. The upper filter layer cleaning water supply tube 8 and the posterior filter layer cleaning water supply tube 28 are branching from a common cleaning water supply tube 34 and an opening and closing valve 36 is provided in the posterior stage cleaning water supply tube 28. The water collecting and distributing pipes 13 and 43 are connected to a reverse water stream cleaning water supply tube 47 and opening and closing valves 48 and 55 are provided in the reverse stream cleaning water supply tube 47. A filtered water delivering tube 49 is connected to the water collecting and distributing pipe 43 and an opening and closing valve 50 is provided in the filtered water delivering tube 49. The water collecting and distributing pipe 13 and the filtered water outlets 27 are connected to each other by a filtered water supply tube 54 and a water supply pump 52 is provided in the filtered water supply tube 54 for supplying filtered water to the posterior filter layer 33.

In this apparatus 60, the support gravel layer 17 used in the apparatus of FIG. 1 is not used but the water collecting and distributing pipes 13 and 43 are provided in the bottom portions of the lower layer 3 of the filter layer 4 and the posterior filter layer 33.

Figure 8A:
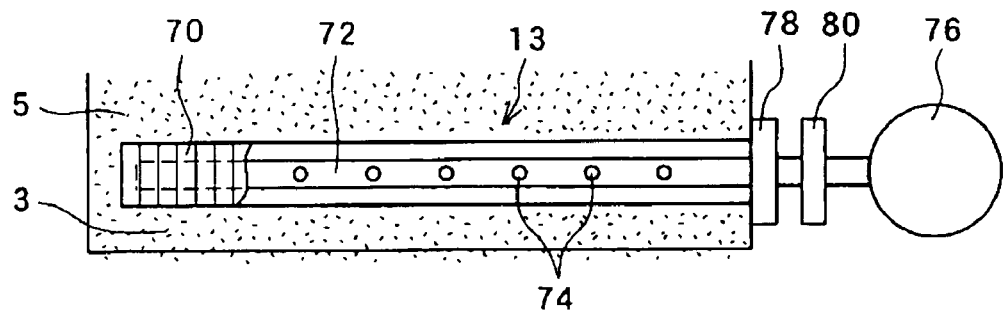
Figure 8B:
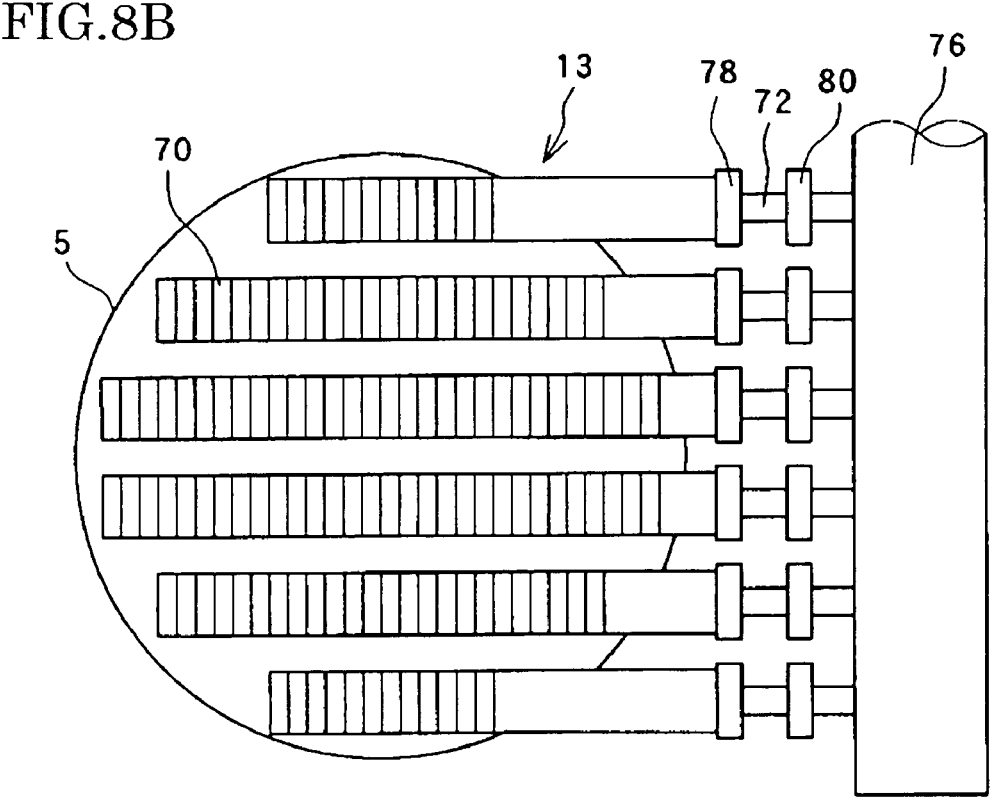

A preferred example of the water collecting and distributing pipe 13 used suitably for a filtering tank in which the support gravel layer is not used is shown in the sectional side view of FIG. 8A and the plan view of FIG. 8B. The illustrated example shows the water collecting and distributing pipe 13 but the water collecting and distributing pipe 33 is of the same construction. In this example, a plurality of the water collecting and distributing pipes 13 are disposed in parallel in the horizontal direction in the bottom portion of the filtering tank 5. Each of the pipes 13 consists of a cylindrical screen 70 which constitutes an outer cylinder and an inner perforated pipe 72 disposed in the center of the cylindrical screen 70. The inner perforated pipe 72 has water collecting and distributing holes 74 formed in the axial direction of the inner perforated pipe on both sides thereof. As the cylindrical screen 70, a cylindrical screen of a known construction in which a helical wire is wound about support rods disposed a predetermined interval in the circumferential direction. In FIG. 8A, the cylindrical screen 70 is shown with its part being removed.

The inner perforated pipe 72 is connected to the cylindrical screen 70 by means of a flange portion 80 and is connected to a water collecting and distributing main pipe 76 by means of a flange portion 80.

In the apparatus 1 of FIG. 1, in a case where the concentration of manganese in raw water is very high, manganese accumulates and forms a film in the support gravel layer 17 and thereby blocks the support gravel layer and water collecting and distributing pipe. In this case, gravels of the support gravel layer 17 and the water collecting and distributing pipe cannot be cleaned by the whole cleaning process and, therefore, the entire support gravel layer 17 and the water collecting and distributing pipe must be taken out of the filtering tank 5 for cleaning, which requires a troublesome work. In the apparatus 60 of FIG. 7, by using no support gravel layer and disposing the water collecting and distributing pipes 13 and 43 consisting of the cylindrical screens 70 and the inner perforated pipes 72 in the lower layer 3 of the filter layer 4 and the posterior filter layer 33, manganese accumulates in a portion about the cylindrical screens 70 even if the concentration of manganese is very high. In this case, the cylindrical screens 70 only are detached from the inner perforated pipes 72 and taken out of the filtering tank for cleaning and this can be advantageously done by a relatively simple work.

The water collecting and distributing pipes 13 can be used not only in the apparatus 60 but also in the apparatus 1 of FIG. 1. In this case, in the apparatus 1 of FIG. 1, the support gravel layer 17 is not used but the water collecting and distributing pipes 13 are disposed in the bottom portion of the lower layer 3.

Description will now be made about operation of this water treatment apparatus 60.

Partial Cleaning Process (1) A filter operation interrupting step is carried out in which supply of raw water is suspended and the filter operation is continued until the water level falls to a level in the vicinity of the surface of the upper layer or to a predetermined height of the upper layer or, alternatively, the water level is lowered by the overflow outlet 11 for lowering the water level. At this time, the valves 48 and 55 of the reverse stream cleaning water supply tube 47 are closed and the valves 53 and 50 of the filtered water supply tubes 54 and 49 are opened.

(2) An upper layer cleaning step is carried out. In the state in which the valve 48 is opened while the valve 55 of the reverse stream cleaning water supply tube 47 remains closed and the valves 53 and 50 of the filtered water takeout tubes 54 and 49 and the valve 36 of the posterior filter layer cleaning water supply tube 28 are closed, reverse stream cleaning water is supplied from the water collecting and distributing pipes 13 at the upper layer cleaning speed (e.g., 5 m/h to 30 m/h) thereby to loosen the filter, material of the upper layer 2 and cleaning water is jetted out of the cleaning water outlets 9a of the upper layer cleaning jet nozzles 9 to stir and clean the filter material of the upper layer 2. At this time, the opening and closing valve 11a of the water level lowering overflow outlet 11 is closed. This upper layer cleaning step is finished before the water level reaches the overflow outlet 12.

(3) After stirring and cleaning of the filter material of the upper layer is finished, a settling step is carried out by causing the stirred filter material of the upper layer 2 to settle to the original state.

(4) A turbid water draining step is carried out by draining turbid water containing iron components caught mainly in the upper layer from the overflow outlet 12 by cleaning the filter materials of the upper layer 2 and the lower layer 3 by supplying reverse stream cleaning water from the water collecting and distributing pipes 13 at the upper layer cleaning speed.

Whole Cleaning Process (1) A filter operation interrupting step is carried out in which supply of raw water is suspended and the filter operation is continued until the water level falls to a level in the vicinity of the surfaces of the upper layer and the posterior filter layer or to predetermined heights of the upper layer and the posterior filter layer or, alternatively, the water level is lowered by the overflow outlet 11 for lowering the water level of the filtering tank 5 and the posterior filtering tank 35.

(2) A cleaning step is carried out. In the state in which the valve 53 of the filtered water supply tube 54 and the valve 50 of the filtered water supply tube 49 are closed while the valves 48 and 55 of the reverse stream cleaning water supply tube 47 and the valve 36 of the posterior filter layer cleaning water supply tube 28 are opened, reverse stream cleaning water is supplied from the water collecting and distributing pipes 13 and 43 at the whole cleaning speed (e.g., 30 m/h to 60 m/h) which is higher than the upper layer cleaning speed to stir the filter material of the upper layer 2, the lower layer 3 and the filter material of the posterior filter layer 33 by the upward directed high speed stream and cleaning water is jetted out of the cleaning water outlets 9a of the upper layer cleaning jet nozzles 9 and the cleaning water outlets 19a of the posterior filter layer cleaning jet nozzles 19 to stir and clean the upper layer, lower layer and posterior filter layer.

(3) After stirring and cleaning of the filter materials of the upper layer, lower layer and posterior filter layer is finished, a settling step is carried out by causing the stirred filter materials of the upper layer, lower layer and posterior filter layer to settle to the original state.

(4) A turbid water draining step is carried out by draining turbid water containing substances caught in the upper layer, lower layer and posterior filter layer from the overflow outlet 12 by cleaning the filter materials of the upper layer, lower layer and posterior filter layer by supplying reverse stream cleaning water at the upper layer cleaning speed.

For determining which of the partial cleaning process and the whole cleaning process should be selected, frequency of the partial cleaning process and frequency of the whole cleaning process are determined in accordance with the ratio of concentration of iron and concentration of manganese and with the filtering speed and the partial cleaning process and the whole cleaning process are conducted according to the respective frequency thus determined.

Figure 9:
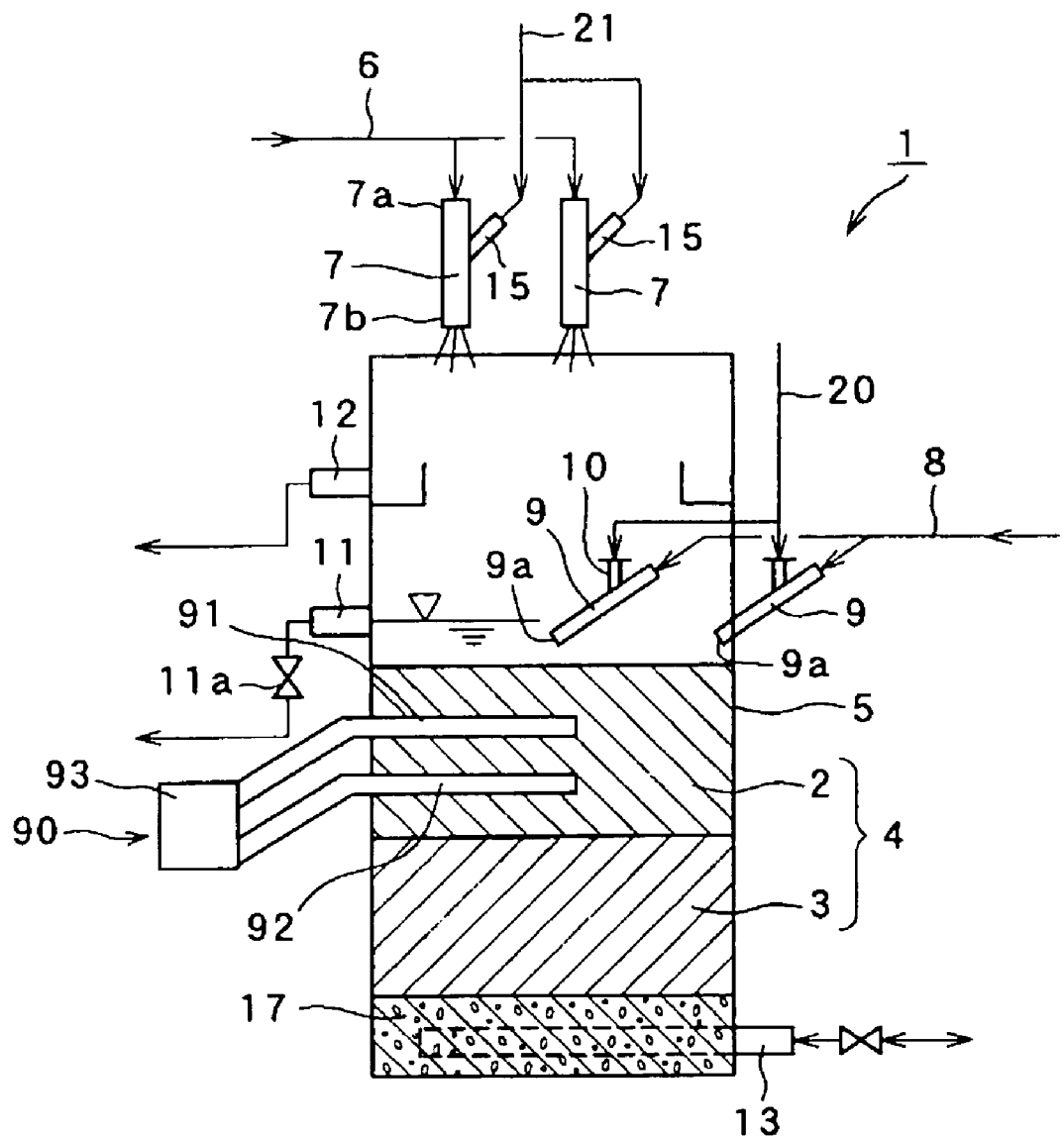
FIG. 9 is a schematic diagram showing another embodiment of the water treatment apparatus.
Figure 10:
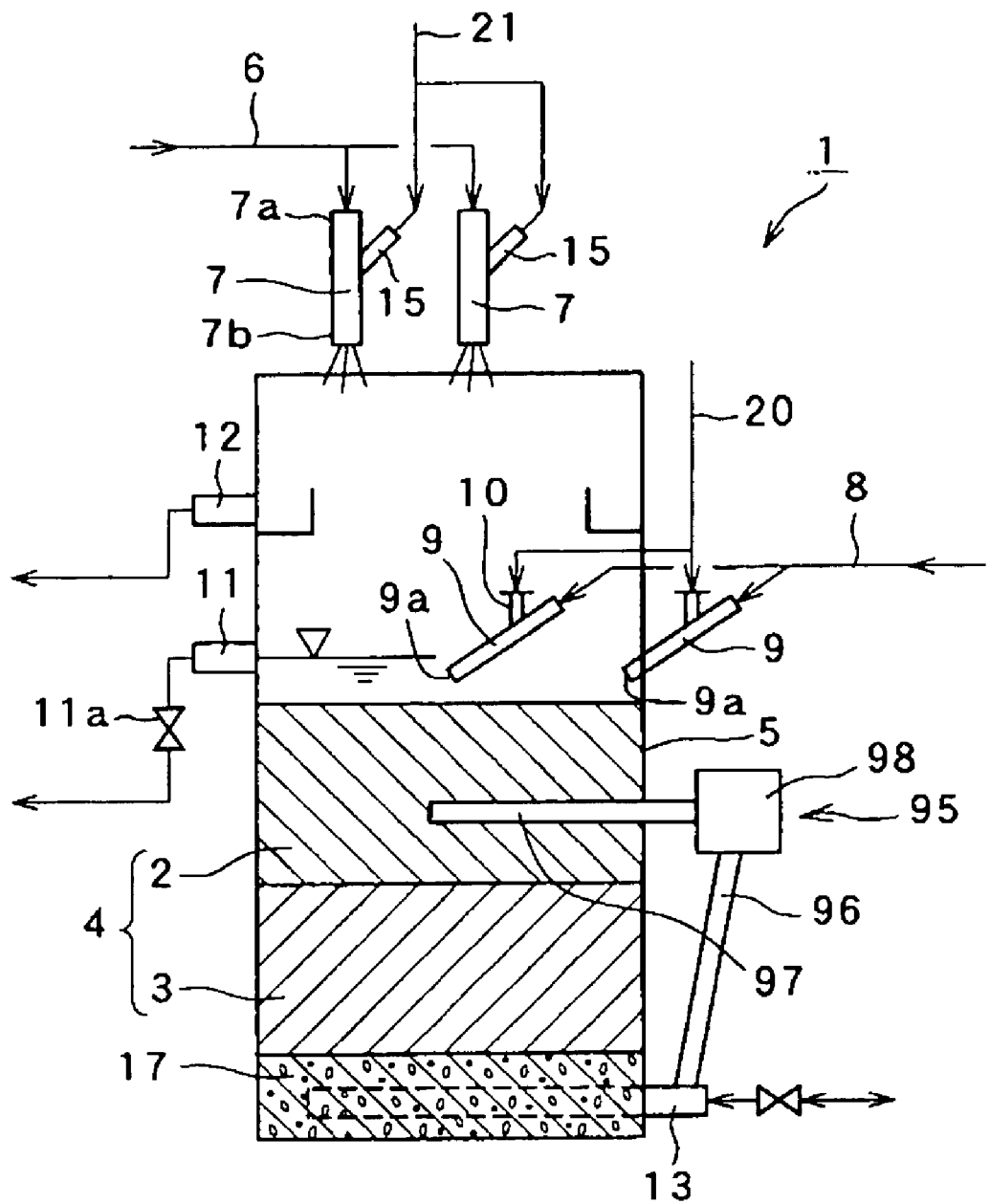
FIG. 10 is a schematic diagram showing another embodiment of the water treatment apparatus.

FIGS. 9 and 10 are diagrams schematically showing other embodiments of the invention.

In a case where ammoniac nitrogen is contained in a high concentration in raw water, it requires a large amount of dissolved oxygen to catch and thereby remove ammoniac nitrogen. It has been found that there is a case where it is difficult to catch and remove ammoniac nitrogen sufficiently in the filter layer by only aeration caused by the mixed raw water jet stream from the mixed raw water stream jet nozzles.

For coping with such situation, in a case where raw water contains ammonic nitrogen in a high concentration, it is preferable to additionally supply dissolved oxygen to the filter layer to supplement aeration by the mixed raw water jet stream.

There are various ways for additionally supplying dissolved oxygen to the filter layer. It is an effective way to pour fine air bubbles having a diameter of several hundred μm or below into the filter layer.

FIG. 9 shows an example of this way. A dissolved oxygen supply device 90 which comprises a treated water intake tube 92 for taking in a part of treated water and a fine air bubble generation device 93 which takes in the treated water from this tube 92 and supplies a mixed stream of the treated water and fine air bubbles from a mixed stream supply tube 91 to the filter layer. As the fine air bubble generation device 93, a known device may be used. As the treated water intake tube 92 and the mixed stream supply tube 91, a tube having the same structure as the water collecting and distributing tubes 13 may be used. When the air bubble has a large diameter, the air bubble tends to stay in the filter layer and form a closed air space and this closed air space is undesirable because it reduces the water treatment area of the filter layer and thereby reduces the filtering efficiency. Since the fine air bubbles used in the present embodiment of the invention have small buoyancy and therefore have a very slow floating speed, these air bubbles are carried away by increasing flow speed of the treated water and these air bubbles reach the lower layer of the filter layer while supplying dissolved oxygen to the filter layer and are driven out of the water collecting and distributing pipe 13 without producing a closed air space in the filter layer. For this reason, in the present invention which is designed for a high speed treatment of water, pouring of fine air bubbles is a preferable method for additionally supplying dissolved oxygen. The amount of fine air bubbles to be supplied may be determined in accordance with a required amount of additional dissolved oxygen which depends upon the state of raw water such as the concentration of ammoniac nitrogen.

FIG. 10 shows another example for achieving the same purpose as FIG. 9. A dissolved oxygen supply device 95 comprises a treated water intake tube 96 which is connected to the water collecting and distributing pipe 13 in a manner to branch off from the pipe 13 to take in a part of treated water and a fine air bubble generation device 98 which takes in the treated water from this tube 96 and supplies a mixed stream of the treated water and fine air bubbles from a mixed stream supply tube 97 to the filter layer. The structures of the treated water intake tube 96 and the mixed stream supply tube 97 are the same as those of the device shown in FIG. 9.

What is claimed is:

1. A method for cleaning a filter layer of a water treatment apparatus comprising the steps of:
   providing an apparatus comprising:
   a raw water supply tube;
   at least one mixed raw water stream jet nozzle having at least one air inlet tube, wherein each said at least one mixed raw water stream jet nozzle fluidically communicates at one end thereof with said raw water supply tube and having at the other end thereof a raw water outlet from which a mixed stream of raw water and air is jetted out;
   a filtering tank housing a filter layer disposed below said at least one mixed raw water stream jet nozzle with a predetermined distance between the surface of the filter layer and the raw water outlet of the mixed raw water stream jet nozzle or nozzles;
   a filtered water takeout tube provided in the filtering tank for taking out water filtered through the filter layer;
   a reverse stream cleaning water supply tube provided in the filtering tank for supplying reverse stream of cleaning water to the filter layer,
   a plurality of filter layer cleaning jet nozzles each fluidically communicating at one end thereof with a filter layer cleaning water supply tube and having at the other end thereof a cleaning water outlet from which cleaning water is jetted out, said filter layer cleaning jet nozzles being disposed at a predetermined circumferential interval above the filter layer in such a manner that the cleaning water outlets are located in the vicinity of the surface of the filter layer; and
   an overflow outlet provided in the filtering tank above the filter layer;
   flowing water through said cleaning jet nozzles to form a swirling stream in the water above the surface of the filter layer, thereby cleaning said filter layer.

* * * * *